United States Patent
Lee et al.

(10) Patent No.: US 10,949,737 B2
(45) Date of Patent: Mar. 16, 2021

(54) METHOD FOR NEURAL NETWORK AND APPARATUS PERFORMING SAME METHOD

(71) Applicants: SAMSUNG ELECTRONICS CO., LTD., Suwon-si (KR); UNIVERSITAET ZUERICH, Zurich (CH)

(72) Inventors: Jun Haeng Lee, Hwaseong-si (KR); Daniel Neil, Zurich (CH); Shih-Chii Liu, Zurich (CH); Tobi Delbruck, Zurich (CH)

(73) Assignees: SAMSUNG ELECTRONICS CO., LTD., Suwon-si (KR); UNIVERSITAET ZUERICH, Zurich (CH)

( * ) Notice: Subject to any disclaimer, the term of this patent is extended or adjusted under 35 U.S.C. 154(b) by 897 days.

(21) Appl. No.: 15/607,007

(22) Filed: May 26, 2017

(65) Prior Publication Data

US 2018/0018558 A1 Jan. 18, 2018

Related U.S. Application Data

(60) Provisional application No. 62/361,626, filed on Jul. 13, 2016, provisional application No. 62/429,146, filed on Dec. 2, 2016.

(30) Foreign Application Priority Data

Sep. 2, 2016 (KR) .................. 10-2016-0113039
Apr. 26, 2017 (KR) .................. 10-2017-0053543

(51) Int. Cl.
*G06N 3/063* (2006.01)
*G06N 3/04* (2006.01)
*G06F 3/00* (2006.01)

(52) U.S. Cl.
CPC ............ *G06N 3/063* (2013.01); *G06N 3/049* (2013.01); *G06N 3/0445* (2013.01); *G06F 3/002* (2013.01)

(58) Field of Classification Search
None
See application file for complete search history.

(56) References Cited

U.S. PATENT DOCUMENTS

| 7,454,388 B2 | 11/2008 | Thaler |
| 7,548,894 B2 | 6/2009 | Fuji |

(Continued)

FOREIGN PATENT DOCUMENTS

| EP | 0749601 B1 | 8/1998 |
| JP | 2003-76976 A | 3/2003 |

(Continued)

OTHER PUBLICATIONS

Communication dated Dec. 8, 2017, issued by the European Patent Office in counterpart European Application No. 17178120.6.

(Continued)

*Primary Examiner* — Alan Chen
(74) *Attorney, Agent, or Firm* — Sughrue Mion, PLLC

(57) ABSTRACT

A method for operating an artificial neuron and an apparatus for performing the method are provided. The artificial neuron may calculate a change amount of an activation based on an input signal received via an input synapse, determine whether an event occurs in response to the calculated change amount of the activation, and transmit, to an output synapse, an output signal that corresponds to the event in response to an occurrence of the event.

25 Claims, 9 Drawing Sheets

(56) References Cited

U.S. PATENT DOCUMENTS

| | | | |
|---|---|---|---|
| 9,092,736 B2 | 7/2015 | Aparin et al. | |
| 2013/0325768 A1* | 12/2013 | Sinyavskiy | G06N 3/049 706/16 |
| 2014/0052679 A1* | 2/2014 | Sinyavskiy | G06N 3/10 706/25 |
| 2014/0317035 A1* | 10/2014 | Szatmary | G06N 3/049 706/27 |
| 2015/0026100 A1 | 1/2015 | Kudritskiy | |
| 2015/0106310 A1 | 4/2015 | Birdwell et al. | |
| 2015/0269481 A1 | 9/2015 | Annapureddy et al. | |
| 2015/0347870 A1 | 12/2015 | Andreopoulos et al. | |
| 2015/0372805 A1* | 12/2015 | Yoon | H03M 3/30 375/358 |
| 2016/0055409 A1 | 2/2016 | Majumdar et al. | |

FOREIGN PATENT DOCUMENTS

| | | |
|---|---|---|
| JP | 5393589 B2 | 1/2014 |
| KR | 10-0442434 B1 | 7/2004 |
| KR | 10-0919684 B1 | 10/2009 |

OTHER PUBLICATIONS

Junyoung Chung et al: "Empirical Evaluation of Gated Recurrent Neural Networks on Sequence Modeling", Dec. 11, 2014, pp. 1-9, XP055344918, (9 pages total).

Ken Chatfield et al; "Return of the Devil in the Details: Delving Deep into Convolutional Nets"; CoRR; Nov. 5, 2014; pp. 1-11; 11 pgs. total.

Alex Krizhevsky et al; "ImageNet Classification with Deep Convolutional Neural Networks"; NIPS; 2012; pp. 1-9; 9 pgs. total.

Robert Hof; "Deep Learning With Massive amounts of computational power, machines can now recognize objects and translate speech in real time. Artificial intelligence is finally getting smart"; 10 Breakthrough Technologies; MIT Technology Review; 2013; (http://www.technologyreview.com/featuredstory/513696/deep-learning/); 14 pgs. total.

Robert D. Hof; "Neuromorphic Chips Microprocessors configured more like brains than traditional chips could soon make computers far more astute about what's going on around them"; 10 Breakthrough Technologies; MIT Technology Review; 2014; (http://www.technologyreview.com/featuredstory/526506/neuromorphic-chips); 11 pgs. total.

Yongqiang Cao et al; "Spiking Deep Convolutional Neural Networks for Energy-Efficient Object Recognition"; International Journal of Computer Vision; 2015; pp. 54-66; 13 pgs. total.

Dan Ciresan et al; "Multi-Column Deep Neural Networks for Offline Handwritten Chinese Character Classification"; Technical Report No. IDSIA-05-13; (http://arxiv.org/pdf/1309.0261.pdf); Sep. 1, 2013; 6 pgs. total.

Matthieu Courbariaux et al; "Low Precision Storage for Deep Learning"; Under review as a conference paper at ICLR; arXiv preprint arXiv:1412.7024; Feb. 26, 2015; 9 pgs. total.

George E. Dahl et al; "Improving Deep Neural Networks for LVCSR Using Rectified Linear Units and Dropout"; 2013 IEEE International Conference on Acoustics; Speech and Signal Processing (ICASSP); 2013; 5 pgs. total.

T. Delbruck; "Real time sensory-motor processing for event-based sensors and systems"; jAER open source project; (https://sourceforge.net/p/jaer/wiki/Home/); 2007; 3 pgs. total.

Peter U. Diehl et al; "Fast-Classifying, High-Accuracy Spiking Deep Networks Through Weight and Threshold Balancing", In International Joint Conference on Neural Networks (IJCNN); 2015; 8 pgs. total.

Xavier Glorot et al; "Deep Sparse Rectifier Neural Networks."; Proceedings of the 14th International Conference on Artificial Intelligence and Statistics; JMLR W&CP Volume; 2011; vol. 15; 2011; pp. 315-323; 9 pgs. total.

Geoffry E. Hinton et al; "A Fast Learning Algorithm for Deep Belief Nets"; Letter; Neural Computation; vol. 18; 2006; pp. 1527-1554; 28 pgs. total.

G.E. Hinton et al; "Reducing the Dimensionality of Data with Neural Networks"; Science; vol. 313; Jul. 28, 2006; 5 pgs. total.

Quoc V. Le et al; "Building High-level Features Using Large Scale Unsupervised Learning"; ICML; 2012; 11 pgs. total.

Yann Lecun et al; "Gradient-Based Learning Applied to Document Recognition", Proceedings of the IEEE, Nov. 1998; pp. 1-46; 46 pgs. total.

Paul A. Merolla et al; "A million spiking-neuron integrated circuit with a scalable communication network and interface"; Science 345, 668 (2014); 2014; 7 pgs. total.

Vinod Nair; "Rectified Linear Units Improve Restricted Boltzmann Machines", Proceedings of the 27th International Conference on Machine Learning (ICML-10); 2010; 8 pgs. total.

Daniel Neil et al; "Minitaur, an Event-Driven FPGA-Based Spiking Network Accelerator"; IEEE Transactions on VLSI Systems; IEEE Transaction on Very Large Scale Integration (VLSI) Systems; vol. 22; No. 12; Dec. 2014; pp. 2621-2628; 8 pgs. total.

Peter O'Connor et al; "Real-time classification and sensor fusion with a spiking deep belief network; frontiers in Neuroscience"; vol. 7; article 178 Oct. 2013; pp. 1-13; 13 pgs. total.

Mihai A. Petrovici et al; "Stochastic inference with deterministic spiking neurons"; (http://arxiv.org/abs/1311.3211); Nov. 2013; pp. 1-6; 6 pgs. total.

Ali Sharif Razavian et al; "CNN Features off-the-shelf: an Astounding Baseline for Recognition"; 2014 IEEE Conference on Computer Vision and Pattern Recognition Workshops (CVPRW); 2014; pp. 806-813; 8 pgs. total.

Jurgen Schmidhuber et al; "Deep Learning in Neural Networks: An Overview"; Neural Networks; Oct. 8, 2014; pp. 1-88; 88 pgs. total.

Pierre Sermanet et al; "OverFeat: Integrated Recognition, Localization and Detection using Convolutional Networks"; (http://arxiv.org/abs/1312.6229); Feb. 24, 2014; pp. 1-16; 16 pgs. total.

Evangelos Stromatias; "Robustness of spiking deep belief networks to noise and reduced bit precision of neuro-inspired hardware platforms"; Frontiers in Neuroscience; vol. 9; Article 222; Jul. 9, 2015; pp. 1-14; 14 pgs. total.

Christian Szegedy et al; "Going Deeper with Convolutions"; Computer Vision Foundation; 2015; pp. 1-9; 9 pgs. total.

\* cited by examiner

100

1000

1100

METHOD FOR NEURAL NETWORK AND APPARATUS PERFORMING SAME METHOD

CROSS-REFERENCE TO RELATED APPLICATIONS

This application claims the benefit of U.S. Provisional Application No. 62/361,626, filed on Jul. 13, 2016 in the U.S. Patent and Trademark Office, and U.S. Provisional Application No. 62/429,146, filed on Dec. 2, 2016, in the U.S. Patent and Trademark Office; and priority from Korean Patent Application No. 10-2016-0113039, filed on Sep. 2, 2016 in the Korean Intellectual Property Office, and Korean Patent Application No. 10-2017-0053543, filed on Apr. 26, 2017, in the Korean Intellectual Property Office, the disclosures of which are incorporated herein by reference in their respective entireties.

BACKGROUND

1. Field

Methods and apparatuses consistent with exemplary embodiments relate to a method and apparatus for operating an artificial neuron.

2. Description of the Related Art

To solve complex problems or problems causing unknown harm, research into applying a human recognition method to a device is being conducted. One such study pertains to a neural network model that is based on human biological nerve cells. The neural network employs an algorithm that simulates a learning capability of a human. The neural network may perform mapping between an input pattern and output patterns through learning. Further, based on a result of the learning, the neural network may generalize the input pattern which remains unused for learning to generate a relatively accurate output result.

SUMMARY

Exemplary embodiments may address at least the problems mentioned above and/or other problems not mentioned above. Also, the exemplary embodiments are not required to overcome the problems mentioned above, and an exemplary embodiment may not overcome any one of the problems mentioned above.

According to an aspect of an exemplary embodiment, there is provided a method which is performable by using a neural network, the method including determining a current activation of an artificial neuron based on a previous activation of the artificial neuron and an input signal received via an input synapse of the artificial neuron, determining a change amount of a first activation based on the current activation and a second activation that corresponds to an event that previously occurred due to the artificial neuron, determining whether a new event occurs based on a first threshold and the determined change amount of the first activation, and transmitting, to an output synapse, an output signal that corresponds to the new event in response to an occurrence of the new event.

The new event may occur in response to a crossing of the determined change amount of the first activation and the first threshold. The output signal may include a sign bit that indicates a direction of a crossing of the determined change amount and the first threshold. The method may further include receiving a second threshold that corresponds to a previous layer connected via the input synapse, wherein the determining of the current activation may include determining the current activation based on the previous activation, the input signal, and the second threshold.

The output signal may include the determined change amount of the first activation approximated as a predetermined degree of a bit precision. The predetermined degree of the bit precision may be adjusted based on at least one from among a degree of requirement accuracy and a volume of available resources. The first threshold may be adjusted based on a number of events that occur during a predetermined time interval. The first threshold may increase in response to the number of the events that occur during the predetermined time interval exceeding a predetermined third threshold, the first threshold may decrease in response to the number of the events that occur during the predetermined time interval being less than a predetermined fourth threshold, and the third threshold may be greater than the fourth threshold.

The method may further include updating the first threshold based on the determined current activation after the output signal is transmitted. The first threshold may be adjusted based on at least one from among a fixed step, a logarithmic step, and an order of magnitude. The method may further include storing the determined current activation.

The method may further include receiving a control signal that indicates a predetermined operation mode, receiving a framed input signal that corresponds to the indicated operation mode via the input synapse, and determining the current activation based on the framed input signal.

The neural network may include any one of an artificial neural network, a fully connected network, a deep convolutional network, a recurrent neural network, and a spiking neural network.

According to another aspect of an exemplary embodiment, there is provided a method which is performable by using a neural network, the method including determining a current activation of an artificial neuron based on a previous activation of the artificial neuron and an input signal received via an input synapse of the artificial neuron, determining whether an event occurs in response to a first cluster that includes the previous activation and a second cluster that includes the determined current activation, and transmitting, to an output synapse, an output signal that corresponds to the event in response to an occurrence of the event.

The event may occur in response to the first cluster differing from the second cluster. The output signal may include at least one change bit that indicates at least one from among a change direction of a cluster and a change amount of the cluster.

According to still another aspect of an exemplary embodiment, there is provided a method which is performable by using a recurrent neural network, the method including obtaining a first input delta vector that corresponds to a first time based on a difference between a second input vector that corresponds to a second time that is earlier than the first time and a first input vector that corresponds to the first time, obtaining a hidden state delta vector that corresponds to a first time based on a difference between a third hidden state vector that corresponds to a third time that is earlier than the second time and a second hidden state vector that corresponds to the second time, determining at least one parameter of the recurrent neural network based on a multiplication of a first weight that corresponds to the first input vector and a second weight that corresponds to the obtained first input delta vector, and a multiplication of a third weight that corresponds to the second hidden state vector and a fourth weight that corresponds to the obtained hidden state delta vector at t−1, and determining a first hidden state vector that corresponds to the first time based on the determined at least one parameter of the recurrent neural network.

The determined at least one parameter of the recurrent neural network may include at least one from among a value of a reset gate, a value of an update gate, and a value of an output hidden state vector.

The obtaining of the first input delta vector may include determining the difference between the second input vector and the first input vector as the first input delta vector in response to the difference between the second input vector and the first input vector being greater than a predetermined threshold, and determining a zero vector as the first input delta vector in response to the difference between the second input vector and the first input vector being less than the predetermined threshold.

The obtaining of the first input delta vector may include obtaining a second reference vector that corresponds to the second time based on a second input delta vector that corresponds to the second time, and obtaining the first input delta vector based on a difference between the obtained second reference vector and the first input vector.

The obtaining of the second reference vector may include determining the second input delta vector as the second reference vector in response to the second input delta vector being greater than a predetermined threshold, and determining a third reference vector that corresponds to the third time as the second reference vector in response to the second input delta vector being less than the predetermined threshold.

The obtaining of the hidden state delta vector may include determining the first input delta vector as the difference between the second input vector and the first input vector in response to the difference between the second input vector and the first input vector being greater than a predetermined threshold, and determining the first input delta vector as a zero vector in response to the difference between the second input vector and the first input vector being less than the predetermined threshold.

According to further aspect of an exemplary embodiment, there is provided an electronic device including a plurality of processing components that respectively correspond to artificial neurons, wherein each of the processing components includes a respective processor and a respective memory configured to store respective computer-readable instructions, and for each respective processor, when the corresponding instructions are executed by the respective processor, the respective processor is configured to determine a current activation based on a previous activation and an input signal received via an input link, determine a change amount of a first activation based on the current activation and a second activation that corresponds to an event that previously occurred, determine whether a new event occurs based on a first threshold and the determined change amount of the first activation, and transmit, to an output link, an output signal that corresponds to the new event in response to an occurrence of the new event.

Each respective processor may be further configured to receive a second threshold that corresponds to a previous layer connected via the input link, and determine the current activation based on the previous activation, the input signal, and the second threshold. Each respective processor may be configured to update the first threshold based on the determined current activation after the output signal is transmitted. Each respective memory may be configured to store the determined current activation.

BRIEF DESCRIPTION OF THE DRAWINGS

The above and/or other aspects will be made more apparent by describing certain exemplary embodiments with reference to the accompanying drawings, in which.

DETAILED DESCRIPTION

Figure 1:
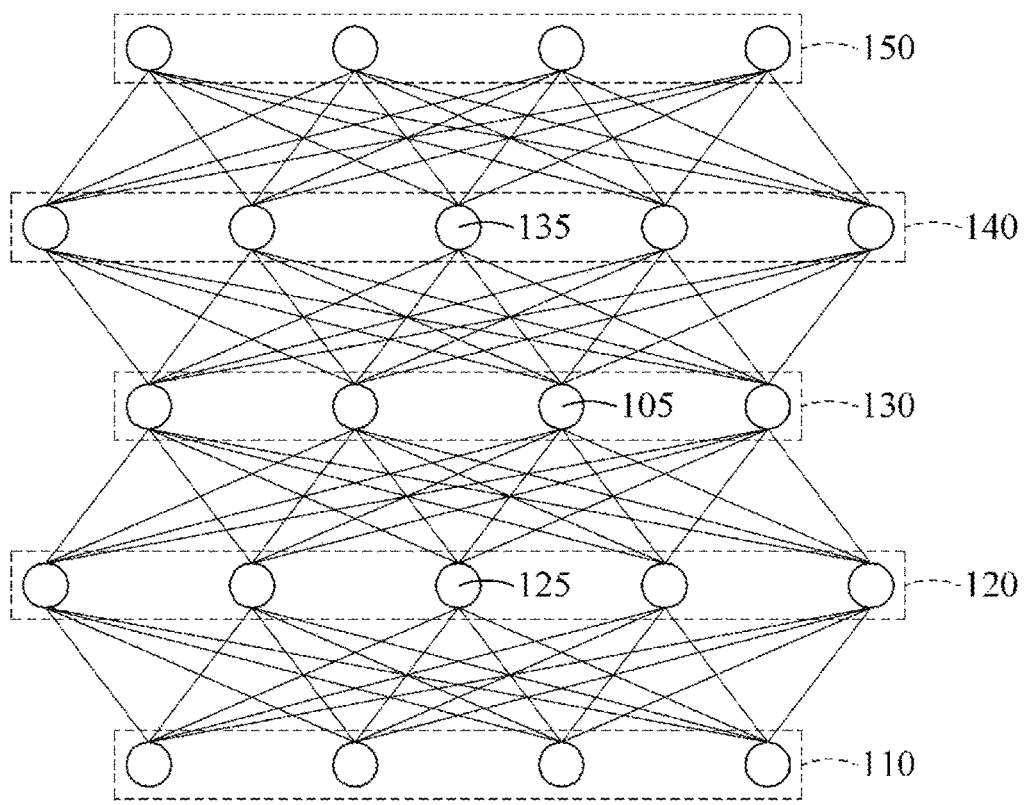
FIG. 1 is a diagram illustrating a neural network, according to an exemplary embodiment.

The following specific structural or functional descriptions are exemplary to merely describe the exemplary embodiments, and the scope of the exemplary embodiments is not limited to the descriptions provided in the present specification. Various changes and modifications can be made thereto by persons having ordinary skill in the art.

Although terms of "first" or "second" are used to explain various components, the components are not limited to the terms. These terms should be used only to distinguish one component from another component. For example, a "first" component may be referred to as a "second" component, or similarly, the "second" component may be referred to as the "first" component within the scope of the right, according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail below with reference to the accompanying drawings, and like reference numerals refer to the like elements throughout.

FIG. 1 is a diagram illustrating a neural network, according to an exemplary embodiment. Referring to FIG. 1, a neural network 100 includes collections 110, 120, 130, 140, and 150, each including artificial neurons.

The neural network 100 operates based on an event so that computational costs required for learning or recognition may be reduced. The neural network 100 may be used for deep learning. Deep learning is a machine learning scheme for tackling complex issues relating to, for example, image recognition and voice or speech recognition, by using large-scale data sets. Feature layers may be extracted from a multilayered neural network via supervised deep learning or unsupervised deep learning. The neural network 100 may be an example of the multilayered neural network. The multilayered neural network may include any of a fully connected network, a deep convolutional network, and a recurrent neural network. For example, the fully connected network may be used for large vocabulary continuous speech recognition, three dimensional (3D) object recognition, face recognition, face matching, and visual classification.

A size and a depth of the multilayered neural network may be greater than those of a general neural network. A size of the neural network 100 may be indicated by a number obtained by multiplying a number of neurons for each layer and a number of layers, and a depth of the neural network 100 may be indicated by a number of layers for each network. For example, a neural network used for a recent vision application includes 41 layers, approximately 143 million weights, and 31 million neurons, and requires 19.7 billion operations. Thus, a great amount of time used for learning and a large volume of data may be required for the multilayered neural network.

To sequentially operate the neural network, the neural network may impose a great computational cost on a processor, for example, a central processing unit (CPU) and a graphic processing unit (GPU). Recent research shows that a million artificial neurons trained in a super computer for days or weeks have been used. When a sequential training method is used, a volume of computing resources may increase as a complexity of a network increases, because all artificial neurons are always updated each time a new sample is input. As will be described in detail below, exemplary embodiments operate based on an event that corresponds to using an input sample, and thereby the volume of computing resources used for calculating an output of the network may be greatly reduced.

In the neural network 100, each of the collections 110, 120, 13, 140, and 150 includes the artificial neurons, and the artificial neurons included in each of the collections 110, 120, 130, 140, and 150 may be connected to other artificial neurons. Other artificial neurons may be included in a same collection that includes the artificial neurons included in each of the collections 110, 120, 130, 140, and 150, or included in a different collection. The collections 110, 120, 130, 140, and 150 may be layers, and the collections 110, 120, 130, 140, and 150 may be also referred to as layers 110, 120, 130, 140, and 150. In this case, the neural network 100 may include the successive layers 110, 120, 130, 140, and 150, each including the artificial neurons. Thus, the neural network 100 may be an example of the multilayered neural network.

Although FIG. 1 illustrates five layers 110, 120, 130, 140, and 150 for ease and convenience of description, the neural network 100 may include various numbers of layers. The layer 110 indicates an input layer, the layers 120, 130, and 140 indicate middle layers or hidden layers, and the layer 150 indicates an output layer. The artificial neurons included in the layers 110, 120, 130, and 140 and not the output layer 150 may be connected to artificial neurons included in a subsequent layer via links which are configured for transmitting an output signal. A number of the links may correspond to a number of the artificial neurons included in the subsequent layer. A link may be referred to as a synapse.

The neural network 100 may be a feedforward network. Each of the artificial neurons included in the neural network 100 may be connected to all artificial neurons of the subsequent layer such that the neural network 100 forms a fully connected network. Alternatively, each of the artificial neurons included in the neural network 100 may have a limited spatial connectivity, as in a convolutional network.

Each of the artificial neurons included in the neural network 100 may be configured to calculate a first linear combination of input values x_i of artificial neurons included in a previous layer. The input values x_i are multiplied by a synaptic weight w_i. The weighted input values may be added to each other, and a sum y of the weighted input values may be expressed as shown in Equation 1.

$$y = \Sigma w\_i x\_i \quad \text{[Equation 1]}$$

The sum y of the weighted input values may be input to an activation function f. For example, the activation function f may include any one of a rectified linear unit (ReLU), a sigmoid, and a hyperbolic tangent. The activation function f may calculate an output value o of each of the artificial neurons as shown in Equation 2.

$$o = f(y) \quad \text{[Equation 2]}$$

Hereinbelow, an operation of the neural network 100 will be described based on an artificial neuron 105. However, descriptions related to the artificial neuron 105 also apply to remaining artificial neurons, for example, artificial neurons 125 and 135. A previous layer of the artificial neuron 105 is also referred to as the layer 120, and a subsequent layer of the artificial neuron 105 is also referred to as the layer 140. A link between the artificial neuron 105 and each of the artificial neurons included in the layer 120 is also referred to as an input synapse, and a link between the artificial neuron 105 and each of the artificial neurons included in the layer 140 is also referred to as an output synapse.

In an example, the artificial neuron 105 may determine whether a new event occurs when an activation of the artificial neuron 105 is changed by a predetermined amount. The activation may be calculated based on inputs received via an input synapse and an activation function that is implemented for the artificial neuron 105.

The neural network 100 is also referred to as a dynamic computation net (DCN). As described in detail below, the DCN may be applied to various types of the neural network 100, for example, an artificial neural network (ANN) or a spiking neural network (SNN). When the neural network 100 is an SNN, the activation of the artificial neuron 105 may be a membrane potential of the artificial neuron 105.

The artificial neuron 105 may transmit, to output synapses, output signals that correspond to the new event in response to an occurrence of the new event. The new event may occur in response to a crossing of a change amount of the activation and a threshold. In this aspect, "a crossing of a change amount of the activation and a threshold" means the change amount of the activation becomes greater than an absolute value of the threshold. The output signals may be multiplied by respective weights of the output synapses, and the artificial neurons included in the subsequent layer may receive the weighted output signals.

For example, an output signal includes a sign bit that indicates a direction of the crossing of the change amount of the activation with respect to the threshold. A neural network including artificial neurons that output a single sign bit when an event occurs is referred to as a basic DCN. In this example, the threshold of the artificial neuron 105 may be also transmitted to the artificial neurons included in the subsequent layer. As another example, a plurality of artificial neurons may share an identical threshold. For example, the artificial neurons included in a same layer may have identical thresholds. In this example, the artificial neurons included in the subsequent layer may receive the threshold shared among the artificial neurons included in the previous layer, and thereby a load caused by a transmission of the threshold may be reduced. The artificial neurons included in the subsequent layer may determine respective activations based on the received sign bit and the threshold. The artificial neuron 105 may update the threshold of the artificial neuron 105 or the threshold shared by other artificial neurons included in a layer that includes the artificial neuron 105 after transmitting the output signals to the subsequent layer. As another example, different thresholds may be set for each predetermined group, or the different thresholds may be set for each individual artificial neuron. As still another example, the entire neural network may use one common threshold.

In an exemplary embodiment, the output signal includes the change amount of the activation. The change amount of the activation is approximated as a predetermined degree of a bit precision. A neural network that outputs the change amount of the activation approximated as the predetermined degree of the bit precision when the event occurs is also referred to as an analog transmission DCN. The approximated change amount of the activation may indicate a successive value. In this example, even though a greater number of bits is requested for transmitting the output signal, the activation of each of the artificial neurons included in the subsequent layer may be accurately calculated, as compared to when the change amount of the activation is indicated by the sign bit. Because the artificial neurons included in the subsequent layer determine the respective activations based on the received change amount of the activations, the threshold of the artificial neuron 105 may not be transmitted.

The artificial neuron 105 may update the threshold of the artificial neuron 105 after the output signal is transmitted to the subsequent layer. In a case of the analog transmission DCN, the change amount of the activation is transmitted, and thus all artificial neurons have respective thresholds. Further, each of the artificial neurons may dynamically change the corresponding threshold based on a function associated with the activation or a volume of available resources, such as, for example, limited bus capacity.

In a case of a basic DCN, when the change amount is greater than the threshold, it may be difficult to transmit the change amount of the activation to the output signal that is limited to the sign bit. However, the artificial neuron 105 of the analog transmission DCN may transmit a single event that accurately indicates the change amount of the activation in lieu of transmitting a plurality of binary events. Thus, the analog transmission DCN may solve a slope overload issue.

As described above, the threshold of the artificial neurons may be updated in response to an occurrence of the new event. The threshold may be adjusted based on any of various methods by using, for example, any of a fixed step, a logarithmic step, or an order of magnitude. For example, when the change amount of the activation is substantially greater than the threshold, the threshold may be adjusted in response to the change amount of the activation. The activation changing from 149 to 150 may be much less meaningful than the activation changing from 0 to 1. Thus, the threshold is adjusted based on the logarithmic step, such that an artificial neuron having a relatively great activation may cause an event only when the change amount of the activation is sufficiently great. A neural network that adjusts the threshold based on the logarithmic step is also referred to as a log stepped threshold DCN. The artificial neurons included in the log stepped threshold DCN may operate based on a basic DCN method or an analog transmission DCN method.

For example, the artificial neuron 105 may be allocated to any one cluster from among a predetermined plurality of k clusters based on the activation of the artificial neuron 105, and determine whether the event occurs in response to a cluster including the artificial neuron 105 that is being changed. Here, k may be a natural number. For example, the artificial neuron 105 belongs to a first cluster based on a previous activation of the artificial neuron 105, but the artificial neuron 105 may determine whether the event occurs when the artificial neuron 105 belongs to a second cluster based on a current activation of the artificial neuron 105.

The artificial neuron 105 may transmit the output signals to the output synapses in response to an occurrence of the event. Here, the output signal includes at least one change bit that indicates at least one from among a change direction of a cluster and a change amount of the cluster. For example, when the cluster that includes the artificial neuron 105 is changed to a high ranking cluster, the artificial neuron 105 may transmit a +1 signal that corresponds to a positive bit. When the cluster that includes the artificial neuron 105 is changed to a low ranking cluster, the artificial neuron 105 may transmit a negative bit, i.e., −1. To indicate that the cluster is changed by at least two levels, the at least one change bit may include more than two bits. A neural network that includes the artificial neurons that output at least one change bit indicating at least one of the change direction of the cluster or the change amount of the cluster when the event occurs is also referred to as a K-level DCN.

The artificial neuron 105 may include a decoder configured to decode the input signal, an encoder configured to generate the output signal, and a transmitter configured to transmit the output signal. The encoder may generate the output signal that corresponds to the event in response to the occurrence of the event. For example, the output signal may include the sign bit, the approximated change amount of the activation, or the change bit. In a case of the basic DCN, the transmitter may transmit the sign bit and the threshold. The decoder, the encoder, and the transmitter may be implemented as, for example, at least one hardware module or at least one software module.

The neural network 100 may operate based on a static configuration in which a setting value of the neural network 100 is fixed, or a dynamic configuration in which the setting value of the neural network 100 is dynamically changed. The setting value may include the threshold and the degree of bit precision. The setting value associated with the dynamic configuration may be changed in a cycle, changed when a predetermined condition is satisfied, and/or changed in response to a request. For example, the threshold may be adjusted based on a number of events that occur during a predetermined time interval. In response to the number of the events occurring during the predetermined time interval exceeding a predetermined first threshold, the threshold increases in order to decrease the number of the events. In response to the number of the events occurring during the predetermined time interval being less than a predetermined second threshold, the threshold decreases in order to increase the number of the events. Here, the first threshold is greater than the second threshold.

Changing a setting value dynamically may be advantageous in terms of optimization of hardware resources for an actual implementation of the neural network 100. For example, the setting value may be adjusted based on at least one of a degree of requirement accuracy and a volume of available resources. In detail, the degree of bit precision may decrease or the threshold may increase to correspond to a priority order, when a relatively high priority is assigned to reducing an amount of consumption or a delay of resources, in lieu of the relatively high priority being assigned to a detection accuracy. In mobile devices, the detection accuracy may be set to be relatively low in order to detect core keywords that initiate sequences of instructions, and the detection accuracy may be set to be relatively high in order to detect consecutive words in response to the core keywords being detected. The detection accuracy may be set to be lower in order to detect remaining keywords other than the core keywords.

By storing states of the artificial neurons of the neural network 100, the artificial neurons may perform a stateful operation. In particular, each of the artificial neurons may store the activation at a point in time when an event occurs in order to calculate the change amount of the activation. As described in detail below, the change amount of the activation may be determined based on a current activation and an activation that corresponds to an event that has previously occurred. Here, the change amount of the activation may be calculated when the activation that corresponds to the event that has previously occurred is stored. The artificial neurons of the feedforward network may perform a stateless operation without storing the states of the artificial neurons, and the states of all the artificial neurons may be set again based on new input samples. Because the neural network 100 is partially updated in response to the occurrence of the event, a number of operations may be greatly reduced as compared to when all networks are updated each time a new sample is input.

In detail, the computational cost for operating the neural network 100 is dependent on an architecture of the neural network 100 and the degree of the bit precision required for the neural network 100. The architecture of the neural network 100 may be determined based on a model of an artificial neuron, a number of layers, a number of artificial neurons for each layer, and a number of synapses for each layer. In terms of the computational cost for calculating network parameters, a sequential update of a two layered fully connected network will be described below as an example.

Assuming that a first layer includes N artificial neurons, a second layer includes M artificial neurons, a degree of precision that corresponds to bit b is used, and a complexity of an operation of a neuron corresponds to c, the computational cost may be associated with N*M*b*c operations (i.e., the product of N, M, b, and c) for each step for the sequential update of the fully connected network. In this case, the computational cost may be reduced unless an input value of the artificial neuron is unchanged, or any one of N*M*b*c operations is deactivated in a condition in which the input value stays at zero.

When α is a ratio of an input value that activates the calculation, the neural network 100 performs N*M*b*c*α operations for each step. When a corresponds to one (i.e., "1"), N*M*b*c*α operations are performed. When a corresponds to zero (i.e., "0"), the number of operations is zero. In the neural network 100, the bit b is set to be a relatively small value and thereby, the computational cost may be reduced. When the bit b corresponds to 1, the neural network 100 operates based on connections of binary values. The accuracy of the neural network 100 and the degree of bit precision may have a trade-off relationship, but an appropriate bit b that satisfies both of the accuracy of the neural network 100 and the degree of bit precision may be selected. A real-time application may occasionally receive an input value for which a change amount for each frame is relatively small. For example, a great number of same pixels may be included between consecutive frames of an input image. Thus, redundant operations may be performed. As a result, the neural network 100 may reduce a number of the redundant operations.

When the artificial neurons transmit the output signals, the neural network 100 may operate in a refresh mode that refreshes the states of all artificial neurons. The refresh mode may be used for preventing the accumulation of a number of an activation error. The activation error may be caused by a noise. The refresh mode is suitable for sufficiently processing information when an input to the neural network 100 is combined with cyclic full information, for example, a framed input such as an image, of all channels and update events of predetermined channels between frames. Although an operation based on an event may terminate in response to the output signal being transmitted in a general mode, all framed inputs may be processed in the refresh mode. The operation based on the refresh mode may be processed in a cycle or processed in response to a request.

For example, the artificial neuron may receive a control signal that indicates a predetermined operation mode, such as, for example, the refresh mode. In this example, the artificial neuron receives an input signal that is framed in correspondence to the operation mode via an input synapse. The artificial neuron may determine a state, for example, the activation, of the artificial neuron based on the framed input signal.

Figure 2:
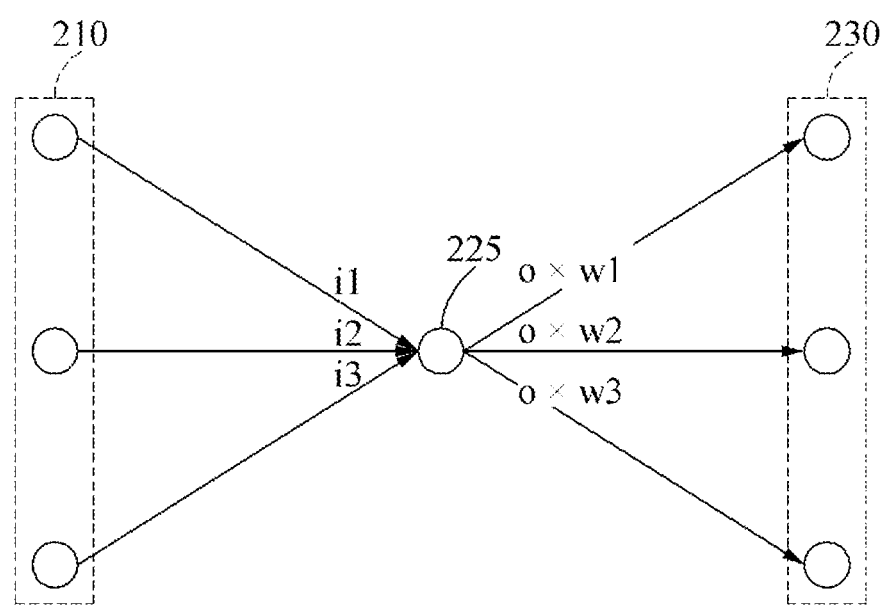
FIG. 2 is a diagram illustrating an input and an output of an artificial neuron, according to an exemplary embodiment.

FIG. 2 is a diagram illustrating an input and an output of an artificial neuron, according to an exemplary embodiment. FIG. 2 illustrates artificial neurons of a previous layer 210, an artificial neuron 225, and artificial neurons of a subsequent layer 230.

The artificial neuron 225 determines a current activation $v\_c$ of the artificial neuron 225 based on a previous activation $v\_p$ of the artificial neuron 225 and input signals i1, i2, and i3. The artificial neuron 225 determines the current activation $v\_c$ by using Equation 3.

$$v\_c = f(v\_p, i, \varphi) \qquad \text{[Equation 3]}$$

In Equation 3, $v\_c$ denotes the current activation, f denotes an activation function, $v\_p$ denotes the previous activation, i denotes a sum of input signals, and φ denotes a parameter of an artificial neuron. The parameter of the artificial neuron includes a bias of the artificial neuron and a state of the artificial neuron. The sum i of the input signals may be determined based on a sum of the input signals i1, i2, and i3. The input signals i1, i2, and i3 may be determined based on a result obtained by multiplying output signals of the artificial neurons of the previous layer 210 and respective weights of input synapses of the artificial neurons 225. After the current activation v_c is determined, the artificial neuron 225 stores the current activation v_c.

The artificial neuron 225 determines a change amount Δv of the activation based on the current activation v_c and an activation v_e that corresponds to an event E_P that has previously occurred due to the artificial neuron 225. The artificial neuron 225 determines, as the change amount Δv of the activation, a value obtained by subtracting the activation v_e from the current activation v_c.

The artificial neuron 225 determines whether a new event E_N occurs based on the change amount Δv of the activation and a threshold VT. In detail, the artificial neuron 225 determines whether the new event E_N occurs in response to a crossing of the change amount Δv of the activation with respect to the threshold VT. The threshold VT includes a first threshold that increases and a second threshold that decreases. Thus, the first threshold is greater than the second threshold. In this case, when the change amount Δv of the activation exceeds the first threshold or the change amount Δv of the activation is less than the first threshold, the artificial neuron 225 determines whether the new event E_N occurs.

The artificial neuron 225 transmits, to the output synapse, an output signal o that corresponds to the new event E_N in response to the occurrence of the new event. The output signal o is multiplied by weights w1, w2, and w3 of each output synapse. Thus, the artificial neurons included in the subsequent layer 230 may receive different input signals based on the weights w1, w2, and w3 of the output synapses connected to the artificial neuron 225.

As described above, in an exemplary embodiment, the output signal o in a basic dynamic computation net (DCN) may include a sign bit that indicates a direction of the crossing of the change amount Δv of the activation with respect to the threshold VT. For example, in response to the change amount Δv of the activation exceeding the first threshold, the artificial neuron 225 transmits a single positive bit, i.e., +1, to the artificial neurons included in the subsequent layer 230. In response to the change amount Δv of the activation being less than the second threshold, the artificial neuron 225 transmits a single negative bit, i.e., −1, to the artificial neurons included in the subsequent layer 230. In this aspect, the threshold VT may be transmitted to the artificial neurons included in the subsequent layer 230 via the output synapses, and the artificial neurons included in the subsequent layer 230 may determine respective activations based on the threshold VT and the sign bit received from the artificial neuron 225.

In another exemplary embodiment, in an analog transmission DCN, the artificial neuron 225 approximates the change amount Δv of the activation as a predetermined degree of bit precision, and the output signal o includes a change amount v_a of the approximated activation. For example, in response to the change amount Δv of the activation exceeding the first threshold or being less than the second threshold, the artificial neuron 225 transmits the change amount v_a approximated as 16 bits to the artificial neurons included in the subsequent layer 230. In this example, the artificial neurons included in the subsequent layer 230 determine the respective activations by using the approximated change amount v_a of the activation received from the artificial neuron 225, and thus the threshold VT is not transmitted.

The artificial neuron 225 updates the threshold VT after the output signal o is transmitted to the artificial neurons included in the subsequent layer 230. The artificial neuron 225 updates the threshold VT based on the current activation v_c that enables the new event E_N to occur. For example, the artificial neuron 225 may update the threshold VT in correspondence with a similar value of the current activation v_c. Alternatively, the artificial neuron 225 may update the threshold VT based on any of various methods using, for example, anyone of a fixed step, a logarithmic step, or an order of magnitude. Detailed descriptions regarding the adjustment of the threshold VT are provided below.

Figure 3:
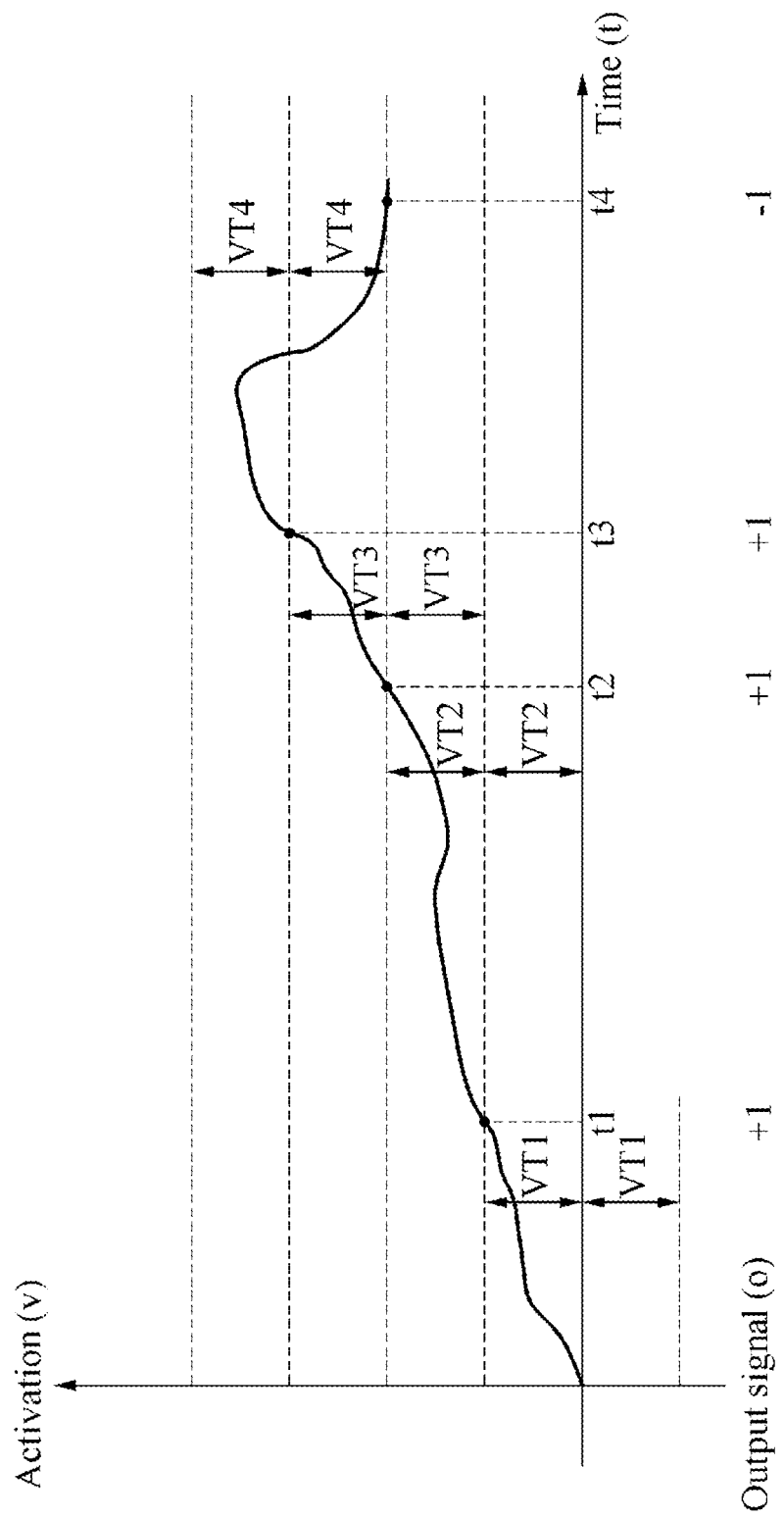
FIG. 3 is a graph illustrating an event determination and an output signal, according to an exemplary embodiment.

FIG. 3 is a graph illustrating an event determination and an output signal, according to an exemplary embodiment. FIG. 3 is a graph illustrating an output signal based on an event and an activation of an artificial neuron as time elapses in a basic dynamic computation net (DCN).

In response to a change amount of an activation exceeding a first threshold VT1 at a point in time t1, an event E1 occurs. Because the change amount of the activation exceeds the threshold VT1, for example, a first threshold that increases, a single bit, such as, for example, a signal having a true logical value indicating +1, is transmitted as an output signal o. After the output signal o is transmitted, the threshold VT1 may be maintained or updated to be a threshold VT2.

In response to the change amount of the activation exceeding the threshold VT2 at a point in time t2 and subsequently exceeding a threshold VT3 at a point in time t3, an event E2 and a subsequent event E3 occur, respectively. In particular, the single bit indicating +1 is transmitted as the output signal o. After the point in time t2, the threshold VT2 is maintained or updated to be a threshold VT4.

In response to the change amount of the activation being less than the threshold VT4 at a point in time t4, an event E4 occurs. Because the change amount of the activation is less than the threshold VT4, for example, a second threshold that decreases, a single bit, such as, for example, a signal having a false logical value indicating −1, is transmitted as the output signal o. After the output signal o is transmitted, the threshold VT4 is maintained or updated to be a threshold VT5.

For ease and convenience of description, it is described that a threshold is maintained without being updated in an example of FIG. 3, but the threshold may be updated in response to an event occurring, as described above.

Figure 4:
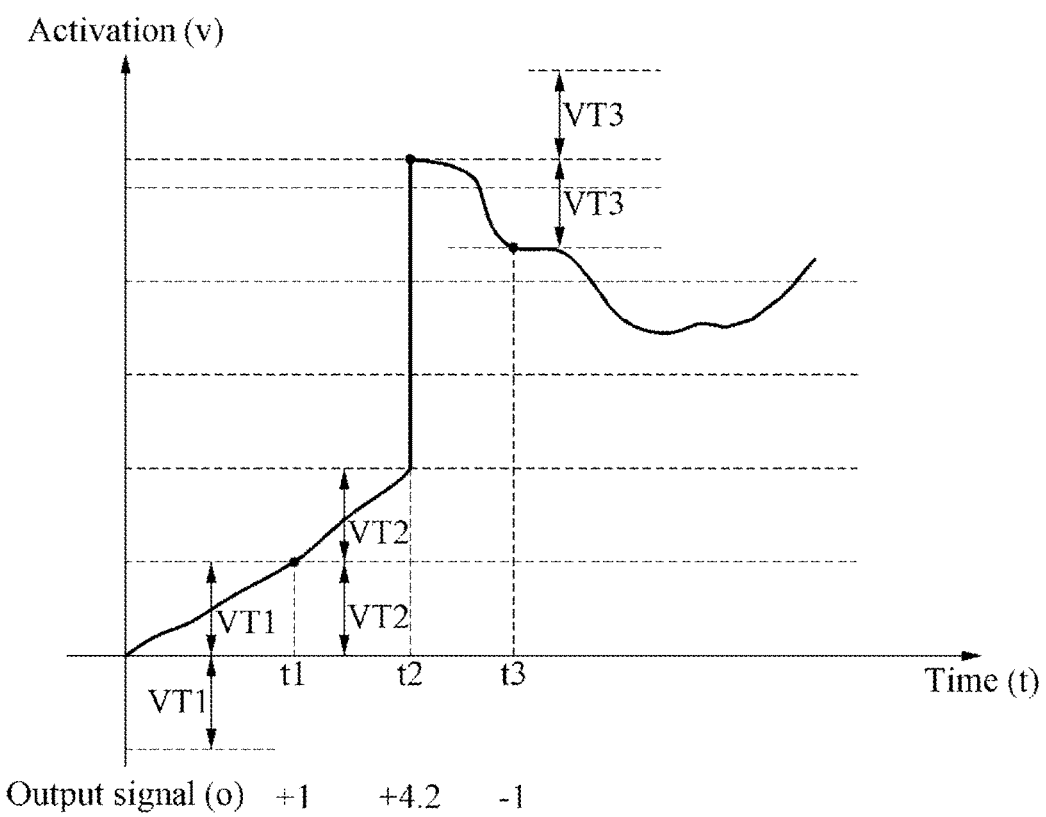
FIG. 4 is a graph illustrating an event determination and an output signal, according to another exemplary embodiment.

FIG. 4 is a graph illustrating an event determination and an output signal, according to another exemplary embodiment. FIG. 4 is a graph illustrating an output signal based on an event and an activation of an artificial neuron as time elapses in an analog transmission computation net (DCN).

In response to a change amount of an activation exceeding a threshold VT1 at a point in time t1, an event E1 occurs. An artificial neuron approximates a change amount +1 of the activation as a predetermined degree of bit precision. The artificial neuron transmits the approximated change amount +1 of the activation as an output signal o. After the output signal o is transmitted, the threshold VT1 is maintained or updated to be a threshold VT2.

In response to the change amount of the activation exceeding the threshold VT2, an event E2 occurs. The artificial neuron approximates a change amount +4.2 of the activation as the predetermined degree of bit precision. The artificial neuron transmits the approximated change amount +4.2 of the activation as the output signal o. After the output signal o is transmitted, the threshold VT2 is maintained or updated to be a threshold VT3.

In response to the change amount of the activation being less than the threshold VT3 at a point in time t3, an event E3 occurs. The artificial neuron approximates a change amount −1 of the activation as the predetermined degree of bit precision. The artificial neuron transmits the approximated change amount −1 of the activation as the output signal o. After the output signal o is transmitted, the threshold VT3 is maintained or updated to be a threshold VT4.

For ease and convenience of description, it is described that a threshold is maintained without being updated in an example of FIG. 4, but the threshold may be updated in response to an event occurring as described above.

Figure 5:
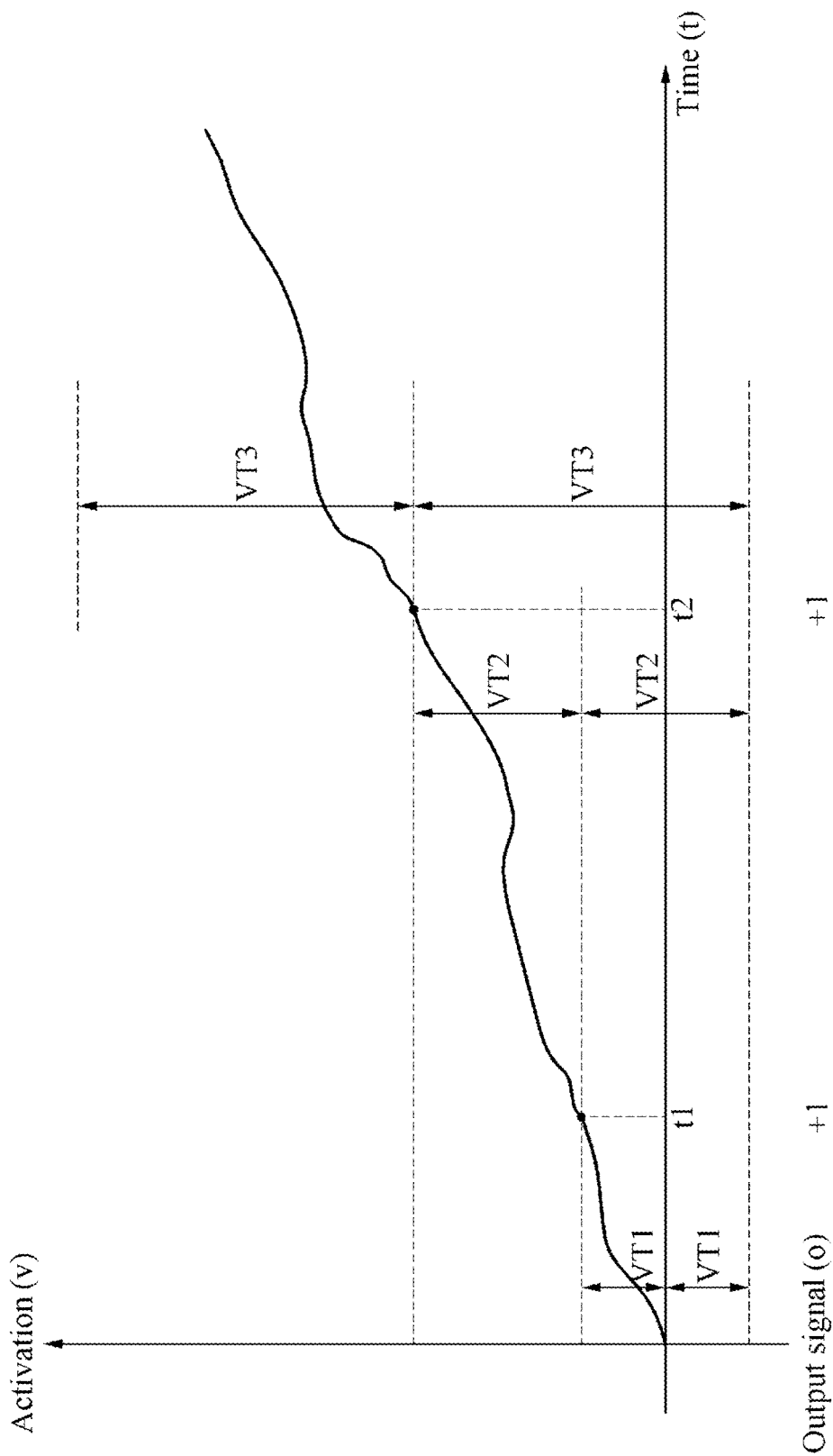
FIG. 5 is a graph illustrating an adjustment of a threshold, according to an exemplary embodiment.

FIG. 5 is a graph illustrating an adjustment of a threshold, according to an exemplary embodiment. FIG. 5 is a graph illustrating an output signal based on an event and an activation of an artificial neuron as time elapses in a log stepped threshold dynamic computation net (DCN).

In response to a change amount of an activation exceeding a threshold VT1 at a point in time t1, an event E1 occurs. Because the change amount of the activation exceeds the threshold VT1, for example, a first threshold that increases, an artificial neuron transmits a single bit indicating +1 as an output signal o. The artificial neuron approximates the change amount +1 of the activation as a predetermined degree of bit precision. The artificial neuron transmits the approximated change amount +1 of the activation as the output signal o.

After the output signal o is transmitted, the threshold VT1 is updated to be a threshold VT2. For example, the threshold VT2 is set to be twice the threshold VT1 based on a logarithmic step. In FIG. 5, the threshold VT1 corresponds to 1 and the threshold VT2 corresponds to 2.

In response to the change amount of the activation exceeding the threshold VT2 at a point in time t2, an event E2 occurs. Because the change amount of the activation exceeds the threshold value VT1, for example, the first threshold that increases, the artificial neuron transmits the single bit indicating +1 as the output signal o. The artificial neuron approximates a change amount +2 of the activation as the predetermined degree of bit precision, and transmits the approximated change amount +2 of the activation as the output signal o.

After the output signal o is transmitted, the threshold VT2 is updated to be a threshold VT3. For example, the threshold VT3 is set to be double the threshold VT2 based on the logarithmic step. In FIG. 5, the threshold VT3 corresponds to 4. As the activation increases, the threshold increases. Thus, the event may occur where the change amount is relatively great. In this aspect, the change amount being relatively small in comparison to an absolute amount of the activation is insignificant. Thus, such a meaningless event may be controlled simply by adjusting the threshold.

Figure 6:
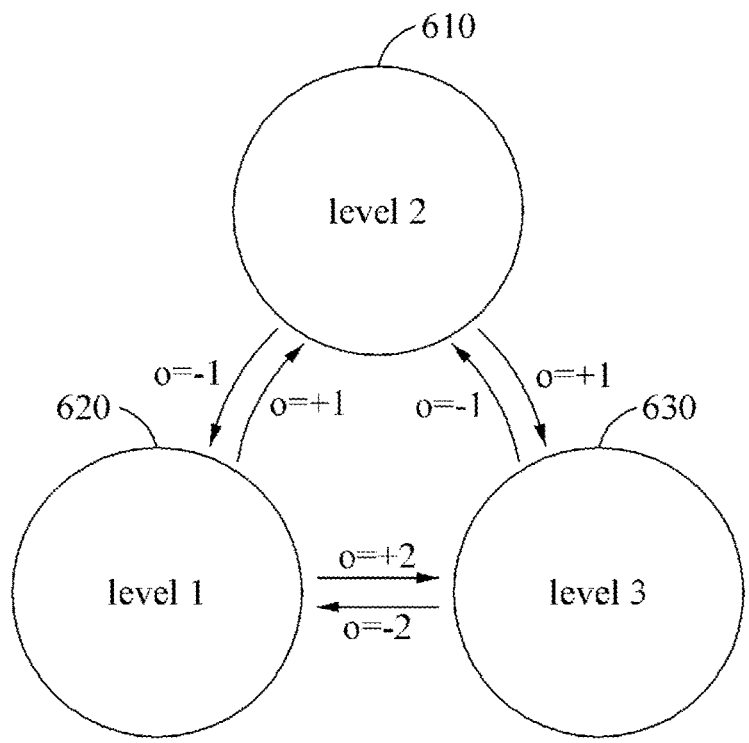
FIG. 6 is a diagram illustrating a change of a cluster, according to an exemplary embodiment.

FIG. 6 is a diagram illustrating a change of a cluster, according to an exemplary embodiment. FIG. 6 illustrates clusters 610, 620, and 630.

As described above, an artificial neuron N determines whether an event E occurs in response to a change of a cluster that includes the artificial neuron N. In detail, the artificial neuron N determines a current activation v_c of the artificial neuron N based on a previous activation v_p of the artificial neuron N and an input signal i received via an input synapse of the artificial neuron N, and determines whether the event E occurs in response to a first cluster that includes the previous activation v_p and a second cluster that includes the current activation v_c. When the first cluster differs from the second cluster, the artificial neuron N determines whether the event E occurs. The artificial neuron N transmits, to the output synapse, an output signal o that corresponds to the event E in response to the occurrence of the event.

The clusters 610, 620, and 630 may have different ranges. For example, in FIG. 6, the cluster 620 has a range that is greater than or equal to 0 and less than 1. The cluster 610 has a range that is greater than or equal to 1 and less than 10, and the cluster 630 has a range that is greater than or equal to 10. The cluster 620 corresponds to a level 1, the cluster 610 corresponds to a level 2, and the cluster 630 corresponds to a level 3. In this example, the artificial neuron N may be included in at least one of the clusters 610, 620, and 630 based on the current activation v_c of the artificial neuron N. For example, artificial neurons having activations greater than or equal to 0 and less than 1 may be included in the cluster 620. A number of clusters and a range of the clusters may be determined based on a range of the activations of the artificial neurons included in a neural network. In more detail, when a distribution of activations of artificial neurons for which learning is complete is divided based on boundary values 0, 1, and 10, the clusters may have a range of the boundary values 0, 1, and 10.

The output signal o includes at least one change bit that indicates at least one from among a change direction of a cluster and a change amount of the cluster. For example, when the cluster including the artificial neuron N is changed to a high ranking cluster, the artificial neuron N transmits the change bit that indicates +1. Based on the aforementioned examples, the cluster 610 corresponds to the high ranking cluster of the cluster 620, and the cluster 630 corresponds to the high ranking cluster of the cluster 610. In addition, the cluster 630 corresponds to a two-level high ranking cluster of the cluster 620. The change bit may include a number of bits that is greater than or equal to two bits for indicating that a cluster is changed by at least two levels. For example, when the cluster including the artificial neuron N is changed to a two-level low ranking cluster, the artificial neuron N transmits the change bits that indicate −2.

For example, when the previous membrane v_p of the artificial neuron N corresponds to 1.5 and the current activation v_c of the artificial neuron N corresponds to 10.5, the artificial neuron N is moved from the cluster 610 to the cluster 630. In this example, the artificial neuron N transmits the change bit that indicates +1 as the output signal o. When the previous activation v_p of the artificial neuron N corresponds to 1.5 and the current activation v_c of the artificial neuron corresponds to 0.5, the artificial neuron N is moved from the cluster 610 to the cluster 620. In this example, the artificial neuron N transmits the change bit that indicates −1 as the output signal o. In addition, when the previous activation v_p of the artificial neuron N corresponds to 0.5 and the current activation v_c of the artificial neuron N corresponds to 10.5, the artificial neuron N is moved from the cluster 620 to the cluster 630. In this example, the artificial neuron N transmits the change bits that indicate +2 as the output signal o.

As described above, in an example, a dynamic computation net (DCN) may be applied to an artificial neural network (ANN) or a spiking neural network (SNN). An exemplary embodiment that relates to applying the DCN to a recurrent neural network (RNN), a type of the ANN, is described below with reference to FIGS. 7, 8, and 9. Descriptions provided below do not limit an application range of the DCN. The DCN may be applied to the ANN or the SNN.

Exemplary embodiments below propose an RNN architecture that is referred to as a delta network. The delta network may correspond to the above-described DCN. Each neuron in the delta network may transmit its value only when a change in its activation exceeds a threshold.

An RNN may be used to process temporal sequences based on a combination of factors that include, for example, any one or more of an increased ability of processing big datasets, more powerful computer resources such as graphic processing units (GPUs), and large improvements in training algorithms. For example, an application such as natural language processing, speech recognition, and an attention-based model for structured prediction may be implemented by using the RNN. The RNN may include a memory and use a gating unit, such as, for example, a long short-term memory (LSTM) unit. A gated recurrent unit (GRU) may greatly improve a training process of the RNN. However, a relatively large amount of resources may be requested to implement the RNN because the RNN is heavily dependent on matrix multiplications to update neuron activations.

In an exemplary embodiment, a feature of an input stream and a feature of neural representation associated with the input stream may be used to reduce the amount of resources for implementing the RNN. In this aspect, the neural representation may correspond to the above-described activation of a neuron.

In general, an input to a neural network may have a relatively high level of temporal autocorrelation. When the input slowly changes over time, this may indicate that a level of the temporal autocorrelation is relatively high. For example, in a case of a video of which a change between frames is relatively small, the level of the temporal autocorrelation may be relatively high. When a neural network processes an input for which the level of the temporal autocorrelation is relatively high, a state of the neural network may be allowed to generate relatively slow-changing activations.

Figure 7:
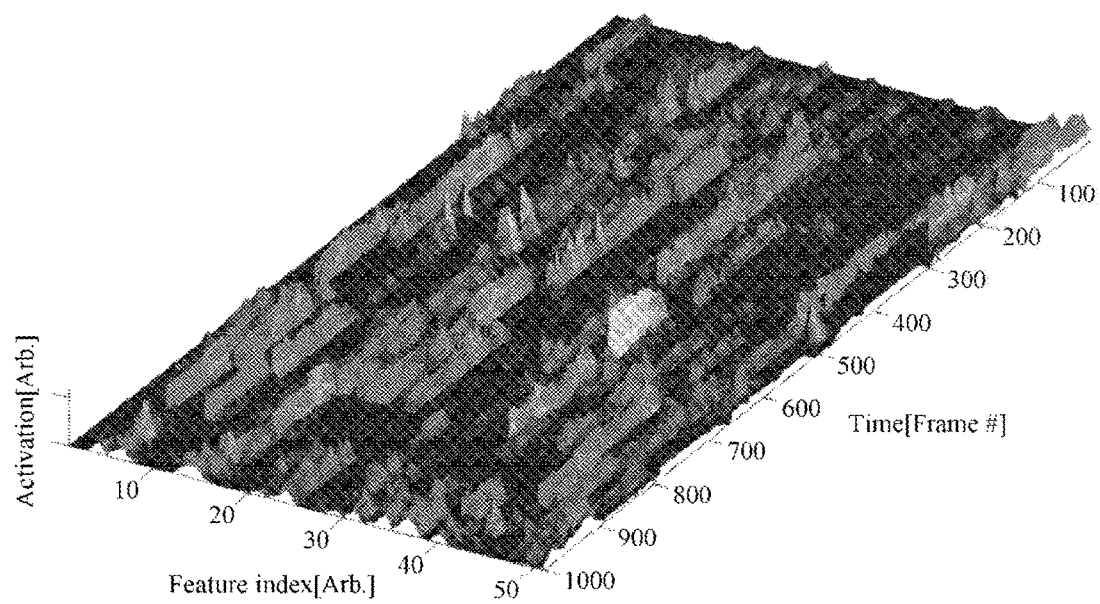
FIG. 7 illustrates a feature of a standard convolutional network that processes a standard video data set.

FIG. 7 illustrates a feature of a standard convolutional network that processes a standard video data set. Referring to FIG. 7, a state of the standard convolutional network that processes the standard video data set may be allowed to generate relatively slow-changing activations. In FIG. 7, activations over time (or frame) may be highly redundant.

For example, the activations may be almost unchanged over time. FIG. 7 may represent a result that first fifty arbitrary features of a top-level feature vector layer are plotted over time when first thousands of frames from a scene recognition clip are applied to the standard convolutional network. Because FIG. 7 shows that peaks are relatively constant over time, the activations may indicate consistency rather than random activations appearing over time.

Figure 8:
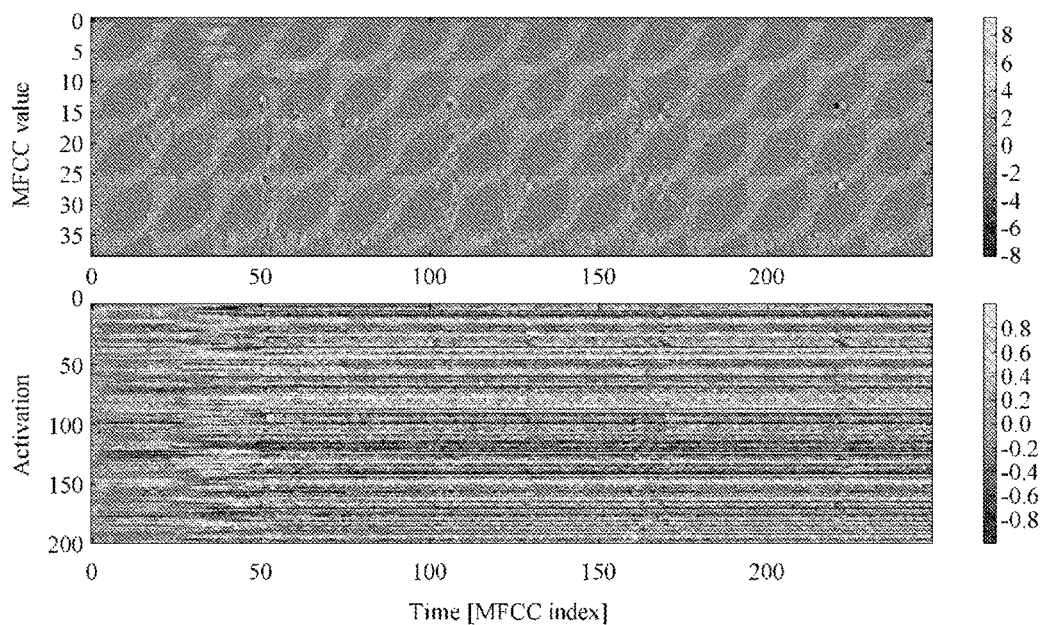
FIG. 8 is a diagram illustrating a stability in recurrent neural network (RNN) activations over time.

FIG. 8 is a diagram illustrating a stability in recurrent neural network (RNN) activations over time. FIG. 8 represents an activation feature of the RNN to which a number recognition data set is applied. In more detail, a top image in FIG. 8 shows mel-frequency cepstral coefficients (MFCC) features for a spoken digit. A bottom image in FIG. 8 shows activations of a neural network in response to the MFCC features.

Referring to FIG. 8, slowly changing activation features may appear in a calculation of the RNN that processes a nerve input. For example, when relatively long and stable representations are present in inputs, the activations over time may be relatively slowly changed and the activations may have a relatively high level of stability over time.

<Concept of Delta Network>

The purpose of a delta network is to transform a dense matrix-vector multiplication, such as, for example, a weight matrix and a state vector, into a sparse matrix-vector multiplication that is combined with a full addition. This transformation may lead to considerable savings on both memory accesses and operations. A matrix-vector multiplication may be defined as shown in Equation 4 to represent this transformation.

$$r = Wx \quad \text{[Equation 4]}$$

In Equation 4, r denotes a reset gate of parameters of the RNN. Although the concept of the delta network is described with reference to the reset gate r below, descriptions below may be applicable to other parameters of the RNN. Based on Equation 4, $n^2$ operations may be used, $n^2+n$ read operations may be performed, and n write operations may be performed for calculating a matrix W of a size n×n and a vector x of a size n. A plurality of matrix-vector multiplications may be considered for a long input vector sequence $x_t$. In particular, an index t is equal to 1, 2, . . . , n. The matrix-vector multiplications may be calculated recursively based on Equation 5.

$$r_t = W\Delta + r_{t-1} \quad \text{[Equation 5]}$$

In Equation 5, $\Delta = x_t - x_{t-1}$ is obtained, and $r_{t-1}$ is a result obtained from the previous calculation. Thus, a calculation cost of Equation 5 is equal to zero (i.e., "0") at t. Further, x0=0 and r0=0. In this example, Δ may be referred to as a input delta vector. If Δ is associated with a hidden state vector, Δ may be referred to as a hidden state delta vector. If Δ is a sparse vector, a form as in Equation 5 may be advantageous in terms of a calculation cost. In more detail, $r_t$ may be calculated as a sum of cost of Δ (i.e., n operations for vector of size n), a cost of adding a stored previous result $r_{t-1}$ (n operations), and a cost of a sparse matrix multiply WΔ (i.e., $n^2$ operations for n×n weight matrix and sparse vector of occupancy ratio s). Similarly, a memory cost for calculating $r_t$ may be determined by fetching n×s weights for the matrix W and storing 2n values for Δ, n values for $r_{t-1}$, and n values that indicate a result.

A use of a threshold value is described to specify that the calculation cost saving is expected even when x has small changes. The calculation cost may be expressed as shown in Equation 6.

$$C_{comp,dense} = n^2$$

$$C_{comp,sparse} = n^2 s + 2n \quad \text{[Equation 6]}$$

In addition, the memory cost may be expressed as shown in Equation 7.

$$C_{mem,dense} = n^2 + n$$

$$C_{mem,sparse} = n^2 s + 4n \quad \text{[Equation 7]}$$

If an occupancy is 10%, $C_{dense}/C_{sparse} \approx n^2/0.1n^2 \approx 10\times$ may be obtained based on Equation 7. Thus, a calculation speed may increase by a factor of ten.

A speedup (i.e., a speed increase) is provided by a number of zeros in each calculated by $\Delta = x_t - x_{t-1}$. The speedup may be determined by a data stream. For example, the speedup may be determined by a number of identical values between $x_t$ and $x_{t-1}$. When the vector x indicates inputs, intermediate activation values, and outputs of the RNN change slowly at each time step, the input values $x_t$ and $x_{t-1}$ may be highly redundant, and a low occupancy s and a corresponding increased speedup may be obtained.

<Delta Network Gated Recurrent Units (GRUs)>

In GRUs, a matrix-vector multiplication operation that can be replaced with a delta network operation may appear several times. Although a case in which a delta network is applied to a GRU is described below as an example that relates to the RNN, the delta network is also applicable to other methods, such as, for example, a long short-term memory (LSTM). Equation 8 represents parameters of the GRU. In Equation 8, r denotes a reset gate value, z denotes an update gate value, c denotes an output hidden state vector, and h denotes an updated hidden state vector. Also, portions indicated in bold type in Equation 8 indicate the matrix-vector multiplication operation. A transposition of W and x may be arbitrarily performed in Equation 8.

$$r_t = \sigma_r(x_t W_{xr} + h_{t-1} W_{hr} + b_r)$$

$$u_t = \sigma_u(x_t W_{xu} + h_{t-1} W_{hu} + b_u)$$

$$c_t = \sigma_c(x_t W_{xc} + r_t \odot (h_{t-1} W_{hc}) + b_c)$$

$$h_t = (1-u_t) \odot h_{t-1} + u_t \odot c_t \quad \text{[Equation 8]}$$

In Equation 8, each of $W_{xr}$, $W_{xu}$, and $W_{xc}$ denotes a respective weight for an input vector x, and each of $W_{hr}$, $W_{hu}$, $W_{hc}$ denotes a respective weight for a hidden state vector h. In the following, $W_{xr}$, $W_{xu}$, and $W_{xc}$ may be represented by $W_x$, and $W_{hr}$, $W_{hu}$, and $W_{hc}$ may be represented by $W_h$. t may denote a time stamp. Portions indicated in bold type in Equation 8 may be replaced with a delta update defined based on Equation 5, and this may be expressed as shown in Equation 9.

$$\Delta_x = x_t - x_{t-1}$$

$$\Delta_h = h_{t-1} - h_{t-2}$$

$$r_t = \sigma_r(\Delta_x W_{xr} + z_{xr} + \Delta_h W_{hr} + z_{hr} + b_r)$$

$$u_t = \sigma_u(\Delta_x W_{xu} + z_{xu} + \Delta_h W_{hu} + z_{hu} + b_u)$$

$$c_t = \sigma_c(\Delta_x W_{xc} + z_{xc} + r_t \odot (\Delta_h W_{hc} + z_{hc}) + b_c)$$

$$h_t = (1-u_t) \odot h_{t-1} + u_t \odot c_t \quad \text{[Equation 9]}$$

As shown in Equation 9, an input delta vector $\Delta_x$ at t may be obtained based on a difference between an input vector $x_{t-1}$ at t−1 (i.e., an input vector that corresponds to a first time) and an input vector $x_t$ at t (i.e., an input vector that corresponds to a second time that is later than the first time), and a hidden state delta vector $\Delta_h$ may be obtained based on a difference between a hidden state vector $h_{t-2}$ at t−2 (i.e., a hidden state vector that corresponds to a third time that is earlier than the first time) and a hidden state vector $h_{t-1}$ at t−1 (i.e., a hidden state vector that corresponds to the first time). In addition, parameters r, u, and c may be determined based on a multiplication of weights $W_x$ for the input delta vector $\Delta_x$ at t and the input vector x, and a multiplication of weights $W_h$ for the hidden state delta vector $\Delta_h$ at t−1 and the hidden state vector h. A hidden state vector ht at t may be determined based on the determined parameters r, u, and c.

In Equation 9, $z_{xr}$, $z_{xu}$, $z_{xc}$, $z_{hr}$, $z_{hu}$, and $z_{hc}$ may be recursively determined as stored results obtained from previous calculation for an input state or a hidden state. For example, $z_{xr}$ may be expressed as shown in Equation 10.

$$z_{xr} := z_{xr,t-1} = (x_{t-1} - x_{t-2}) W_{xr} + z_{xr,t-2} \quad \text{[Equation 10]}$$

An operation based on Equation 10 may be similarly applied to values $z_{xu}$, $z_{xc}$, $z_{hr}$, $z_{hu}$, and $z_{hc}$. An initial condition at a time x0 is z0:=0. Further, as indicated in equations above, a plurality of additive terms that include stored full-rank pre-activation states and biases may be merged into single values. The merged single values may result in one or two stored vector values per gate type. For example, the stored vector values may be expressed as shown in Equation 11.

$$M_{t-1} := z_{x,t-1} + z_{h,t-1} + b \quad \text{[Equation 11]}$$

Finally, based on the above-described condition of the initial state, stored values M may be initialized at the correct biases, for example, $M_{r,0} = b_r$, $M_{u,0} = b_u$, $M_{xc,0} = b_c$, and $M_{hr,0} = 0$. Through this, Equation 12 may be defined for the delta network GRUs.

$$\Delta_x = x_t - x_{t-1}$$

$$\Delta_h = h_{t-1} - h_{t-2}$$

$$M_{r,t} := \Delta_x W_{xr} + \Delta_h W_{hr} + M_{r,t-1}$$

$$M_{u,t} := \Delta_x W_{xu} + \Delta_h W_{hu} + M_{u,t-1}$$

$$M_{xc,t} := \Delta_x W_{xc} + M_{xc,t-1}$$

$$M_{hc,t} := \Delta_h W_{hc} + M_{hc,t-1}$$

$$r_t = \sigma_r(M_{r,t})$$

$$u_t = \sigma_u(M_{u,t})$$

$$c_t = \sigma_c(M_{xc,t} + r_t \odot (M_{hc,t}))$$

$$h_t = (1-u_t) \odot h_{t-1} + u_t \odot c_t \quad \text{[Equation 12]}$$

<Approximate Calculations in Delta Networks>

The above-described equations may be designed to provide a precisely same answer as an original calculation in a network. For example, when a difference between an input vector at t−1 and an input vector at t is greater than a predetermined threshold, the difference between the input vector at t−1 and the input vector at t may be determined as an input delta vector. When the difference between the input vector at t−1 and the input vector at t is less than the predetermined threshold, a zero vector may be determined as the input delta vector. A hidden state delta vector may be determined based on the same method.

An applicative approach may be possible by using the above-described equations. For example, instead of skipping a vector-multiplication operation when a change in an activation is equal to zero, the vector-multiplication may be skipped when the change in the activation is less than a predetermined threshold value θ. In particular, the change in the activation may correspond to the above-described delta vectors. This may not produce precisely the same result, but instead may produce an approximately correct result.

Figure 9:
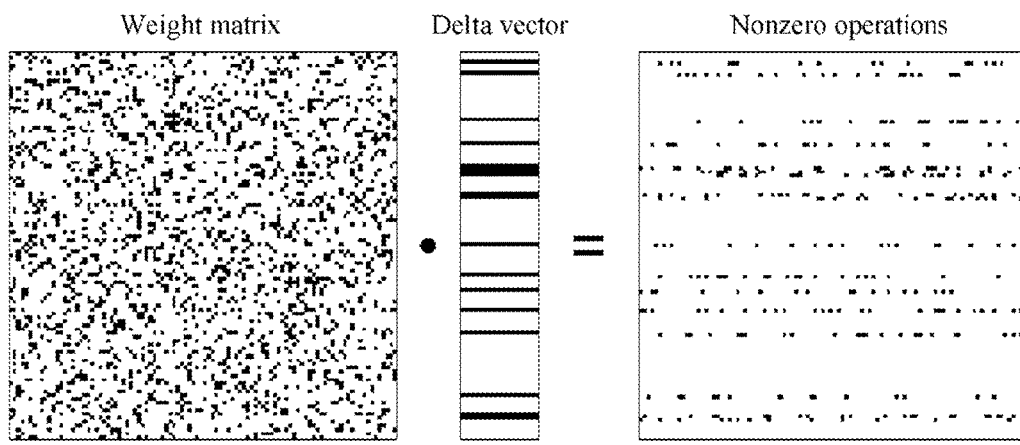
FIG. 9 is a diagram illustrating a result of calculation obtained through a delta network.

FIG. 9 is a diagram illustrating a result of calculation obtained via a delta network. In FIG. 9, nonzero values are indicated by black. Referring to FIG. 9, only 20% occupancy of a weight matrix may be retrieved in response to 20% occupancy of a delta vector. Further considering that the weight matrix has 20% occupancy, only 4% occupancy of an original weight matrix may appear to be used in an actual calculation.

When a nonzero threshold value is used, errors may accumulate over multiple time steps. For example, an input value $x_t$ increases by Θ on every time step, a change may not occur although significant changes in activation accumulate. Thus, a memory of a previous time step may be set to store a recent value that causes a change that exceeds the threshold value instead of storing a difference from a recent time step. Such an operation may be defined based on Equation 13.

$$\hat{x}_{i,t-1} = \begin{cases} x_{i,t-1} & \text{if } |\Delta_{x,t-1}| > \Theta \\ \hat{x}_{i,t-2} & \text{otherwise} \end{cases} \quad \text{[Equation 13]}$$

$$\Delta x_i, t = \begin{cases} x_{i,t} - \hat{x}_{i,t-1} & \text{if } |x_{i,t} - \hat{x}_{i,t-1}| > \Theta \\ 0 & \text{otherwise} \end{cases}$$

$$\hat{h}_{i,t-1} = \begin{cases} h_{i,t-1} & \text{if } |\Delta_{h,t-1}| > \Theta \\ \hat{h}_{i,t-2} & \text{otherwise} \end{cases}$$

$$\Delta h_i, t = \begin{cases} h_{i,t} - \hat{h}_{i,t-1} & \text{if } |h_{i,t} - \hat{h}_{i,t-1}| > \Theta \\ 0 & \text{otherwise} \end{cases}$$

In Equation 13, $\hat{x}_i$ and $\hat{h}_i$ denote reference vectors. For example, when an input delta vector $\Delta_{x,t-1}$ at t−1 is greater than a predetermined threshold $\Theta$, an input vector $x_{i,t-1}$ at t−1 may be determined as a reference vector $\hat{x}_{i,t-1}$ at t−1. When the input delta vector $\Delta_{x,t-1}$ at t−1 is less than the predetermined threshold $\theta$, a reference vector $\hat{x}_{i,t-2}$ at t−2 may be determined as the reference vector $\hat{x}_{i,t-1}$ at t−1.

In particular, when an input delta vector $\Delta x_{i,t}$ is calculated, a difference between a current value of an input $x_{i,t}$ and a recent value of the delta vector $\hat{x}_{i,t-1}$ may be used. In this example, i denotes a component of a vector at a time t, and $\hat{x}_{i,t-1}$ has a nonzero value. In addition, when a delta change is less than the predetermined threshold value $\Theta$, the delta change is set to be zero, and a small approximation error to be corrected may be produced when a sufficiently large change produces a nonzero update. Similarly, a hidden state delta vector $\Delta h_{i,t}$ may be obtained by using Equation 13.

Hereinbelow, descriptions of a training method and an optimization scheme that calculate a delta network model are provided. When additional constraints are added to a training process, a more robust and accelerated delta network may be obtained. Descriptions of a constraint condition will be provided below.

<Training Method> a) Rounding network activations: The above-described thresholded delta network calculation may perform a function that is similar to a rounding in a partially calculated state. Δ terms are set to be zero at a small difference, but a network may be updated when the difference is relatively large. Various methods for strengthening the network may be considered for a small rounding error caused when the rounding is performed in the training process. To increase accuracy, an activation rounding may be performed. In this case, the network is successfully trained and thus, the network may be robust against such small rounding errors. In addition, the calculation of low precision may reduce an amount of power consumption.

In this aspect, a low-resolution parameter $\theta_L$ in a fixed-point form $Q_{m,f}$ having m integer bits and f fractional bits may be generated from a high-resolution parameter $\theta$ using a deterministic and gradient-preserving rounding. The low-resolution parameter $\theta_L$ may be expressed as shown in Equation 14.

$$\theta_L = \text{round}(2^f \cdot \theta) \cdot 2^{-f} \quad \text{[Equation 14]}$$

In Equation 14, $\theta_L$ may be obtained by determining a value of $2^f \cdot \theta$ clipped to a range [−2 m+f−1, 2 m+f−1] and a rounding function of Equation 15.

$$\nabla \theta_L = \nabla \theta \quad \text{[Equation 15]}$$

In Equation 15, $\nabla$ denotes a gradient operator. During a forward pass, the low-resolution parameter $\theta_L$ may be used to generate outputs that consider an effect of lower precision, and small gradient updates may accumulate over time in the high resolution parameter $\theta$. When the training process is finished, the high parameter $\theta$ may be discarded and the low resolution parameter $\theta_L$ may be used. A parameter of a simulation result may be an activation.

b) Adding Gaussian noise to network activations: When a threshold value is applied, a network may be relatively robust against non-propagation of small changes, and relatively large changes may be considered important. Another method of providing robustness against small changes is to add a Gaussian noise to all positions having thresholded delta activation. The Gaussian noise may be added as shown in Equation 16.

$$r_t = \sigma_r((x_t + \eta_{xr})W_{xr} + (h_{t-1} + \eta_{hr})W_{hr} + b_r)$$

$$u_t = \sigma_u((x_t + \eta_{xu})W_{xu} + (h_{t-1} + \eta_{hu})W_{hu} + b_u)$$

$$c_t = \sigma_c((x_t + \eta_{xc})W_{xc} + r_t \odot ((h_{t-1} + \eta_{hc})W_{hc}) + b_c)$$

$$h_t = (1 - u_t) \odot h_{t-1} + u_t \odot c_t \quad \text{[Equation 16]}$$

In Equation 16, $\eta \sim N(\mu, \sigma)$ indicates a determination of a vector of samples η from a Gaussian distribution having a mean μ and a variance σ for each $\eta \in \{\eta\ xr, \eta\ hr, \eta\ xu, \eta\ hu, \eta\ xc, \eta\ hc\}$ and for each component in each vector. Typically, the value μ is set to be zero so that an expectation value is unbiased. For example, $E[x_t + \eta_{xr}] = E[x_t]$ is obtained. The variance σ may be set to evaluate a general rounding error caused by non-updates.

<Direct Calculation in Delta Network Model>

An operation of adding a Gaussian noise is still not identical to a truncation operation performed in a thresholded delta network. Thus, a model may be directly trained in the delta network. By directly training a model to be tested, a network may be made more robust against general types of errors caused by the thresholded delta network.

<Changes in Activation Occurring in Sparsity Cost>

As a network is trained by using a delta network model, a cost may be associated with delta conditions or may be added to an overall cost. In a batch, an $L_1$ norm for Δh may be calculated as a mean absolute delta change, and the $L_1$ norm may be adjusted by a weighting factor β. A sparse cost L may be added to a loss function. Equation 17 shows the sparse cost L.

$$\mathcal{L}_{Sparse} = \beta \|\Delta h\mu \quad \text{[Equation 17]}$$

In this example, the $L_1$ norm is used to determine sparse values in Δh such that fewer delta updates are required. In an exemplary embodiment, because Δ is not optimized during training, Δx is not a target of the $L_1$ norm. Thus, Δx may not be included in a relational equation.

<Optimization Methods> a) Effect of weight sparsity: An amount of sparsity of a weight matrix of a deep network after training may affect reduction of calculation cost and speed enhancement. The amount of sparsity of the weight matrix in a trained low precision network may be relatively large. Zeros may act multiplicatively with a delta vector to generate a lower number of necessary multiply-accumulate operations. Thus, by considering an effect of the weight sparsity for a number of updates, a speed may be enhanced without causing any additional accuracy loss.

Figure 10:
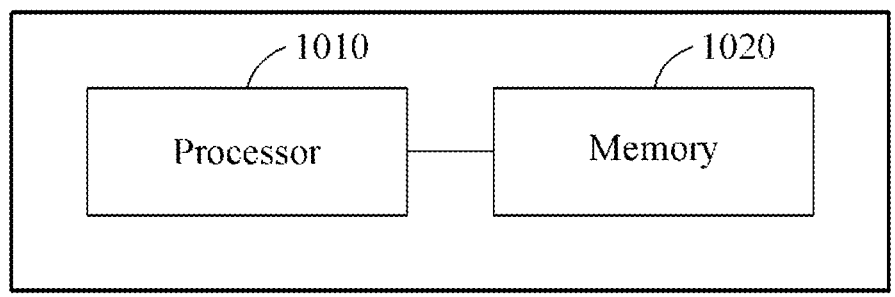
FIG. 10 is a block diagram illustrating an electronic device, according to an exemplary embodiment.

FIG. 10 is a block diagram illustrating an example of an electronic device, according to an exemplary embodiment. Referring to FIG. 10, an electronic device 1000 includes a processor 1010 and a memory 1020. The aforementioned neural network may be implemented in the electronic device 1000.

The processor 1010 includes at least one of apparatuses described with reference to FIGS. 1 through 9 or performs at least one of methods described with reference to FIGS. 1 through 9. For example, the processor 1010 may process operations of the aforementioned artificial neurons. In detail, with respect to each of neurons included in a neural network, the processor 1010 processes an operation for determining a current activation based on a previous activation and an input signal received via an input synapse, an operation for determining a change amount of an activation based on the current activation and an activation that corresponds to an event that has previously occurred, an operation for determining whether a new event occurs in response to the change amount of the activation and a threshold, and an operation for transmitting an output signal that corresponds to the new event to an output synapse in response to an occurrence of the new event.

The memory 1020 stores instructions which are intended to be read in a computer. When the instructions stored in the memory 1020 are executed in the processor 1010, the processor 1010 processes the operations of the aforementioned artificial neurons. The memory 1020 stores data associated with the aforementioned neural network. For example, the memory 1020 stores the activation of each of the artificial neurons and a weight of a synapse. The memory 1020 may be a volatile memory or a non-volatile memory.

The processor 1010 executes a program and controls the electronic device 1000. The electronic device 1020 is connected to an external device, such as, for example, any of a personal computer (PC), a mobile device, or a network via an input and output device (not shown), thereby performing a data exchange. The electronic device 1000 may include any of various electronic systems, such as, for example, a mobile device such as a mobile phone, a smartphone, a personal digital assistant (PDA), a tablet computer, and a laptop computer, a computing device such as a PC, a tablet computer, and a netbook, and an electronic product such as a television (TV), a smart TV, and a security device for gate control. The aforementioned descriptions may be applicable to the electronic device 1000, and thus further description is not repeated here.

Figure 11:
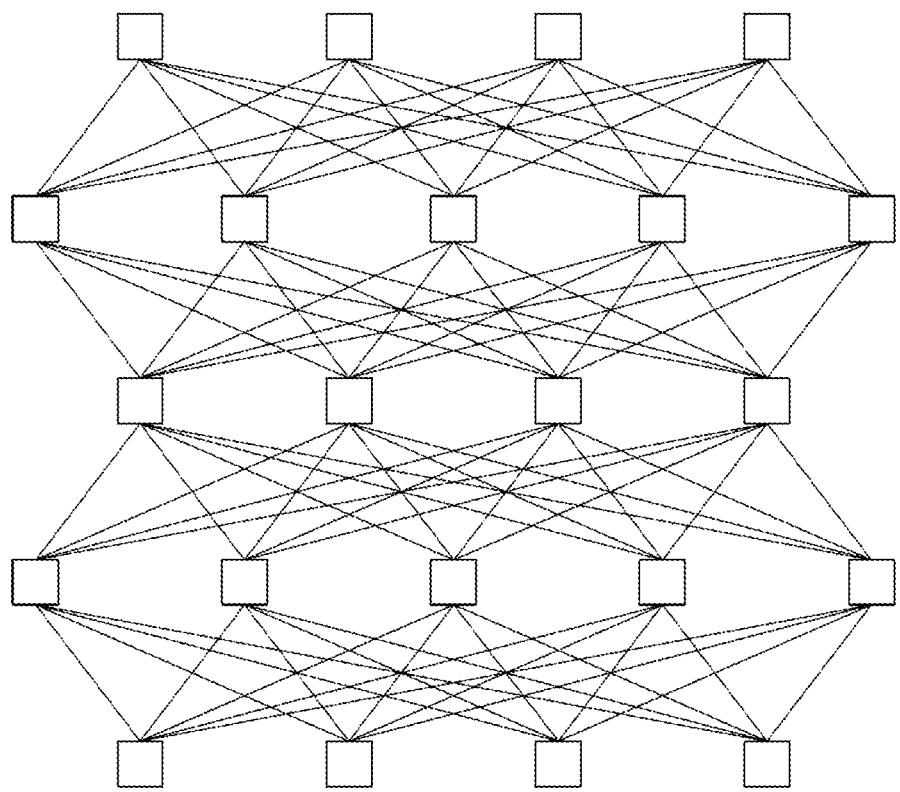
FIG. 11 is a diagram illustrating an electronic device, according to another exemplary embodiment.

FIG. 11 is a block diagram illustrating another example of an electronic device, according to an exemplary embodiment. Referring to FIG. 8, an electronic device 1100 includes processing units (also referred to herein as "processing components") corresponding to artificial neurons.

Each of the processing units may correspond to each of the artificial neurons in a neural network. Each of the processing units may process an operation for each of the corresponding artificial neurons, and/or store data associated with each of the corresponding artificial neurons. The processing units are connected to each other via a link. The link may correspond to a synapse, and the link may be limited to have a predetermined bit width. Each of the processing units includes a respective processor and a respective memory configured to store computer-readable instructions. For example, the process included in each of the processing units may be implemented as an arithmetic logic unit (ALU). Each of the processing units may be connected to all processing units of another layer, as in a fully connected network, or may have connectivity of a limited space, as in a convolutional network.

When the instructions stored in the memory are executed in the processor, the processor determines a current activation based on a previous activation and an input signal received via an input link, determines a change amount of the activation based on the current activation and an activation that corresponds to an event that has previously occurred, determines whether a new event occurs in response to the change amount of the activation and a threshold, and transmits an output signal that corresponds to the new event to an output link in response to an occurrence of the new event. The memory stores the current activation of the artificial neuron that corresponds to the memory. The aforementioned descriptions may be applicable to the electronic device 1100, and thus further description is not repeated here.

Figure 12:
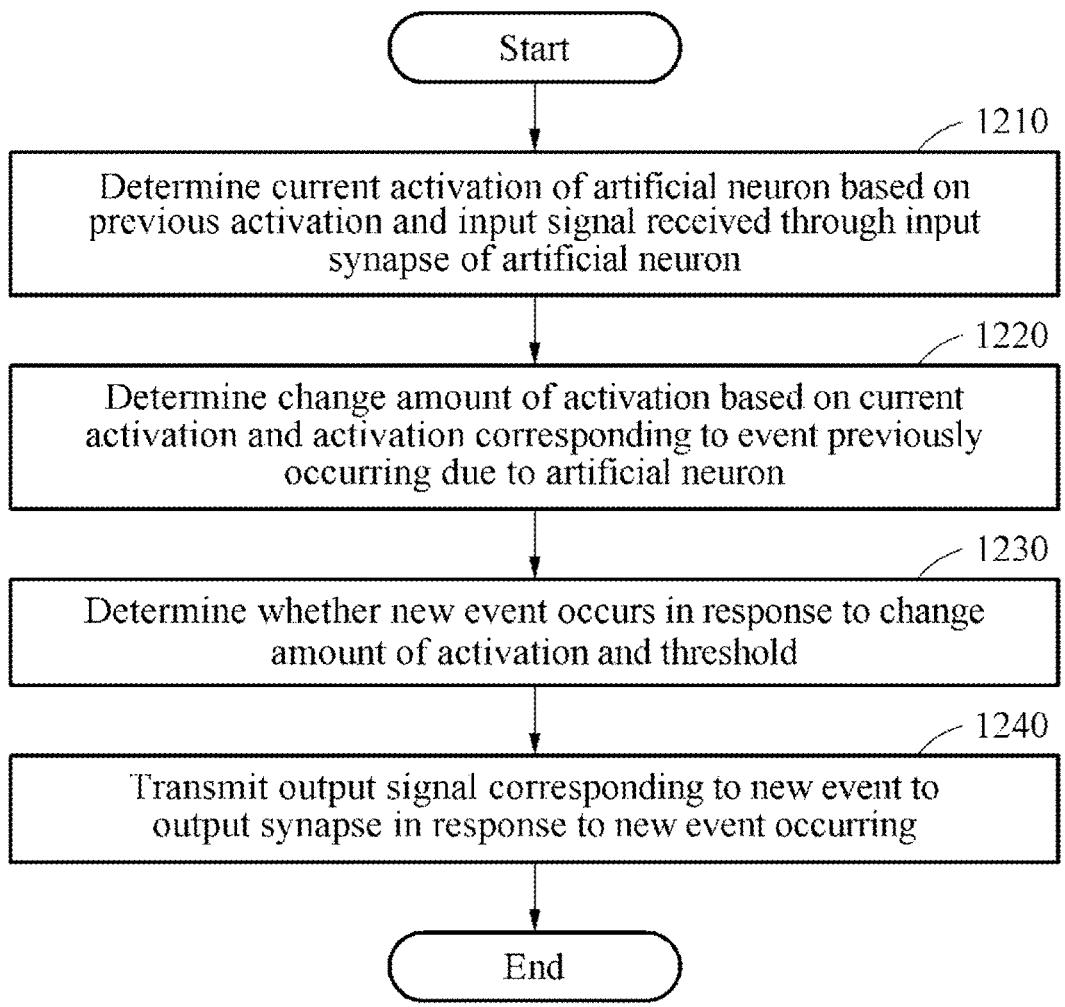
FIG. 12 is a flowchart illustrating a method for operating an artificial neuron, according to an exemplary embodiment.

FIG. 12 is a flowchart illustrating a method for operating an artificial neuron, according to another exemplary embodiment. Referring to FIG. 12, in operation 1210, an artificial neuron determines a current activation of the artificial neuron based on a previous activation and an input signal received via an input synapse of the artificial neuron. In operation 1220, the artificial neuron determines a change amount of the activation based on the current activation and an activation that corresponds to an event that has previously occurred due to the artificial neuron. In operation 1230, the artificial neuron determines whether the new event occurs in response to the change amount of the activation and a threshold. In operation 1240, the artificial neuron transmits, to an output synapse, an output signal that corresponds to the new event in response to an occurrence of the new event. The aforementioned descriptions may be applicable to an operating method of the artificial neuron, and thus further description is not repeated here.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device that is capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is presented as singular; however, one of ordinary in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the exemplary embodiments, or they may be of the kind well-known and available to persons having ordinary skill in the computer software arts. Examples of non-transitory computer-readable media include magnetic media such as hard disks, floppy disks, and magnetic tape; optical media such as compact disk-read-only memory (CD ROM) disks and digital versatile disks (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

While the present disclosure includes specific exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each exemplary embodiment are to be considered as being applicable to similar features or aspects in other exemplary embodiments. Suitable results may be achieved if the described techniques are performed in a different order, and/or if components in a described system, architecture, device, or circuit are combined in a different manner and/or replaced or supplemented by other components or their equivalents. Therefore, the scope of the present disclosure is defined not by the detailed description, but by the claims and their equivalents, and all variations within the scope of the claims and their equivalents are to be construed as being included in the present disclosure.

What is claimed is:

1. A method which is performable by using a neural network, the method comprising:
    determining a current activation of an artificial neuron based on a previous activation of the artificial neuron and an input signal received via an input synapse of the artificial neuron;
    determining a change amount of a first activation based on the determined current activation and a second activation that corresponds to an event that previously occurred due to the artificial neuron;
    determining whether a new event occurs based on a first threshold and the determined change amount of the first activation; and
    transmitting, to an output synapse, an output signal that corresponds to the new event in response to an occurrence of the new event.

2. The method of claim 1, wherein the new event occurs in response to a crossing of the first threshold by the determined change amount of the first activation.

3. The method of claim 1, wherein the output signal includes a sign bit that indicates a direction of a crossing of the determined change amount and the first threshold.

4. The method of claim 1, further comprising:
    receiving a second threshold that corresponds to a previous layer connected via the input synapse,
    wherein the determining of the current activation comprises determining the current activation based on the previous activation, the input signal, and the second threshold.

5. The method of claim 1, wherein the output signal includes the determined change amount of the first activation approximated as a predetermined degree of a bit precision.

6. The method of claim 5, wherein the predetermined degree of the bit precision is adjusted based on at least one from among a degree of requirement accuracy and a volume of available resources.

7. The method of claim 1, wherein the first threshold is adjusted based on a number of events that occur during a predetermined time interval.

8. The method of claim 7, wherein the first threshold increases in response to the number of the events that occur during the predetermined time interval exceeding a predetermined third threshold, the first threshold decreases in response to the number of the events that occur during the predetermined time interval being less than a predetermined fourth threshold, and the third threshold is greater than the fourth threshold.

9. The method of claim 1, further comprising:
    updating the first threshold based on the determined current activation after the output signal is transmitted.

10. The method of claim 9, wherein the first threshold is adjusted based on at least one from among a fixed step, a logarithmic step, and an order of magnitude.

11. The method of claim 1, further comprising:
    storing the determined current activation.

12. The method of claim 1, further comprising:
    receiving a control signal that indicates a predetermined operation mode;
    receiving a framed input signal that corresponds to the indicated operation mode via the input synapse; and
    determining the current activation based on the framed input signal.

13. The method of claim 1, wherein the neural network includes at least one from among an artificial neural network, a fully connected network, a deep convolutional network, a recurrent neural network, and a spiking neural network.

14. A non-transitory computer-readable medium storing instructions that, when executed by a processor, cause the processor to perform the method of claim 1.

15. An electronic device comprising:
    a plurality of processing components that respectively correspond to artificial neurons,
    wherein each of the processing components includes a respective processor and a respective memory configured to store respective computer-readable instructions, and
    wherein for each respective processor, when the corresponding instructions are executed by the respective processor, the respective processor is configured to:
        determine a current activation based on a previous activation and an input signal received via an input link,
        determine a change amount of a first activation based on the current activation and a second activation that corresponds to an event that previously occurred,
        determine whether a new event occurs based on a first threshold and the determined change amount of the first activation, and transmit, to an output link, an output signal that corresponds to the new event in response to an occurrence of the new event.

16. The electronic device of claim 15, wherein the new event occurs in response to a crossing of the first threshold by the determined change amount of the first activation.

17. The electronic device of claim 15, wherein the output signal includes a sign bit that indicates a direction of a crossing of the determined change amount and the first threshold.

18. The electronic device of claim 15, wherein each respective processor is further configured to receive a second threshold that corresponds to a previous layer connected via the input link, and to determine the current activation based on the previous activation, the input signal, and the second threshold.

19. The electronic device of claim 15, wherein the output signal includes the determined change amount of the first activation approximated as a predetermined degree of a bit precision.

20. The electronic device of claim 19, wherein the predetermined degree of the bit precision is adjusted based on at least one from among a degree of requirement accuracy and a volume of available resources.

21. The electronic device of claim 15, wherein the first threshold is adjusted based on a number of events that occur during a predetermined time interval.

22. The electronic device of claim 21, wherein the first threshold increases in response to the number of the events that occur during the predetermined time interval exceeding a predetermined third threshold, the first threshold decreases in response to the number of the events that occur during the predetermined time interval being less than a predetermined fourth threshold, and the third threshold is greater than the fourth threshold.

23. The electronic device of claim 15, wherein each respective processor is configured to update the first threshold based on the corresponding determined current activation after the output signal is transmitted.

24. The electronic device of claim 23, wherein the first threshold is adjusted based on at least one from among a fixed step, a logarithmic step, and an order of magnitude.

25. The electronic device of claim 15, wherein each respective memory is configured to store the corresponding determined current activation.

* * * * *